US006534765B1

(12) United States Patent
Robb et al.

(10) Patent No.: US 6,534,765 B1
(45) Date of Patent: Mar. 18, 2003

(54) ATMOSPHERIC PRESSURE PHOTOIONIZATION (APPI): A NEW IONIZATION METHOD FOR LIQUID CHROMATOGRAPHY-MASS SPECTROMETRY

(75) Inventors: Damon B. Robb, Oakland, CA (US); Andries Pieter Bruins, Leek (NL)

(73) Assignee: MDS Inc., Ontario (CA)

( * ) Notice: Subject to any disclaimer, the term of this patent is extended or adjusted under 35 U.S.C. 154(b) by 161 days.

(21) Appl. No.: 09/697,401

(22) Filed: Oct. 27, 2000

Related U.S. Application Data

(60) Provisional application No. 60/162,709, filed on Oct. 29, 1999.

(51) Int. Cl.[7] .......................... B01D 59/44; H01J 49/00

(52) U.S. Cl. .................... 250/288; 250/282; 250/423 P

(58) Field of Search ................................ 250/282, 288, 250/423 P

(56) References Cited

U.S. PATENT DOCUMENTS

| | | | | |
|---|---|---|---|---|
| 4,804,846 A | | 2/1989 | Hall | 250/288 |
| 4,814,612 A | | 3/1989 | Vestal et al. | |
| 4,883,958 A | * | 11/1989 | Vestal | 250/282 |
| 5,338,931 A | * | 8/1994 | Spangler et al. | 250/423 P |
| 5,381,006 A | | 1/1995 | Wells et al. | |
| 5,808,299 A | | 9/1998 | Syage | 250/288 |
| 5,828,062 A | * | 10/1998 | Jarrell et al. | 250/288 |
| 5,917,185 A | | 6/1999 | Yeung et al. | |
| 5,968,837 A | | 10/1999 | Döring et al. | |
| 6,100,522 A | * | 8/2000 | Chiang | 250/288 |
| 6,211,516 B1 | | 4/2001 | Syage et al. | |
| 6,225,623 B1 | * | 5/2001 | Turner et al. | 250/286 |

FOREIGN PATENT DOCUMENTS

SU 1159412 A1 1/1964
WO WO 95/34089 12/1995

OTHER PUBLICATIONS

I.A. Revel'skii et al. "Chemical and Physicochemical Methods of Analysis—Mass Spectrometry with Photoionization at Atmospheric Pressure and the Analysis of Multicomponent Mixtures without Separation" 1991 Plenum Publishing Corporation pp. 243–248.

22–Physical Org. Chem. volu. 107, 1987 pp. 38989.

D.B. Robb et al. "Analytical Chemistry—Atmospheric Pressure Photoionization: An Ionization Method for Liquid Chromatography—Mass Spectrometry", volu. 72, No. 15 pp. 3653–3659, Aug. 1, 2000.

Syagen—"Photoionization MS".

* cited by examiner

*Primary Examiner*—Bruce Anderson
(74) *Attorney, Agent, or Firm*—Daniel C. Abeles; Eckert Seamans Cherin & Mellott, LLC

(57) ABSTRACT

There is provided a method of, and apparatus for, analyzing a sample of an analyte provided as a sample solution comprising a solvent and an analyte. A dopant is provided, either separately or as the solvent of the sample solution. The sample solution is formed into a spray, for example in a nebulizer, and the solvent evaporated. The sample stream is irradiated in a region at atmospheric pressure, either in the liquid state prior to formation of a spray, or in the liquid state after formation of a droplet spray, or in the vapour state after evaporation of the sprayed droplets, to ionize the dopant. Then, subsequent collisions between the ionized dopant and the analyte, either directly or indirectly, result in ionization of the analyte. Analyte ions are passed from the atmospheric pressure ionization region into a mass analyzer for mass analysis. This technique has been found to give much enhanced ionization for some substances, as compared to atmospheric pressure chemical ionization.

28 Claims, 8 Drawing Sheets

Figure 1:
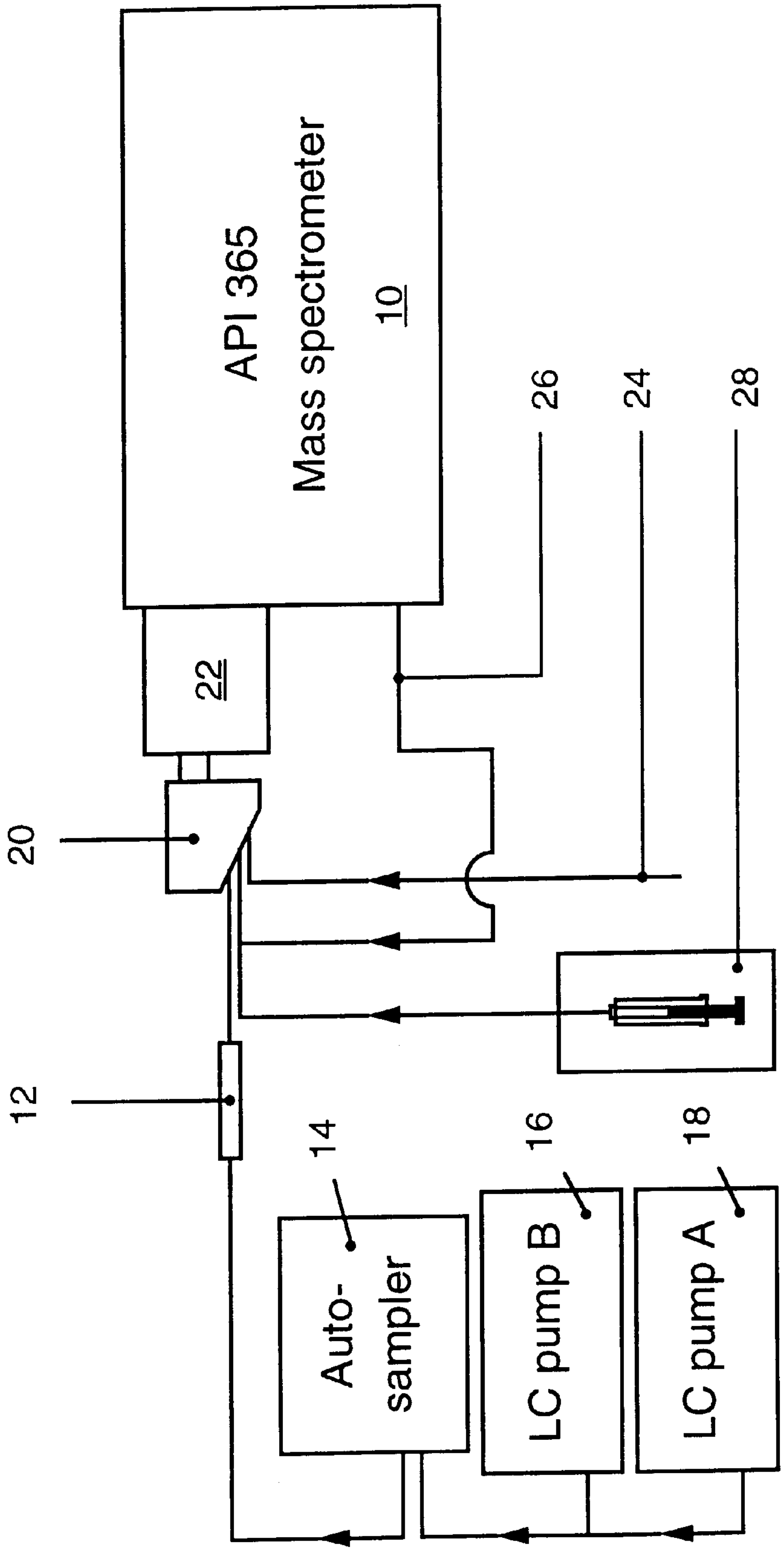

ATMOSPHERIC PRESSURE PHOTOIONIZATION (APPI): A NEW IONIZATION METHOD FOR LIQUID CHROMATOGRAPHY-MASS SPECTROMETRY

CROSS REFERENCE TO RELATED APPLICATION

This application claims the benefit of Provisional Application Serial No. 60/162,709, filed Oct. 29, 1999.

FIELD OF THE INVENTION

This invention relates to liquid chromatography (LC) and mass spectrometry (MS). More particularly, this invention is concerned with both a method and apparatus for providing improved creation and detection of ions by use of photoionization (PI), in conjunction with LC and MS.

BACKGROUND OF THE INVENTION

While atmospheric pressure photoionization (APPI) is known, it has not previously been applied to liquid chromatography-mass spectrometry (LC-MS). Furthermore, there have been very few reports of PI combined with LC, despite the longstanding use of photoionization detection (PID) with gas chromatography (GC).

Photoionization detection in GC typically involves the use of a discharge lamp that generates vacuum-ultraviolet (VUV) photons. If one of these photons is absorbed by a molecule in the column eluant with a first ionization potential (IP) lower than the photon energy, then single photon ionization may occur. The photoions thereby generated are detected as current flowing through a suitable collection electrode; a chromatogram can be obtained by plotting the current detected during a chromatographic run versus time. For PID-GC, the discharge lamp is normally selected such that the energy of the photons is greater than the IP of the analyte, but below the IP of the carrier gas. (Most organic molecules have ionization potentials in the range of 7–10 eV; the common GC carrier gases have higher values, e.g. helium, 23 eV). Ionization of the analyte can then occur selectively and low background currents may be achieved.

There are a few earlier reports in the literature of combining LC and PI. (Schermund, J. T., Locke, D. C. Anal. Lett. 1975, 8, 611–625; Locke, D. C., Dhingra, B. S., Baker, A. D. Anal. Chem. 1982, 54, 447–450; Driscoll, J. N., Conron, D. W., Ferioli, P., Krull, I. S., Xie, K.-H. J. Chromatogr. 1984, 302, 43-50; De Wit, J. S. M., Jorgenson, J. W. J. Chromatogr. 1987, 411, 201–212). However, these also relied upon direct detection of the photoion current, without mass analysis. Selective ionization was possible in these experiments, too, because the common LC solvents also have relatively high IP's (water, IP=12.6 eV; methanol, IP=10.8 eV; acetonitrile, IP=12.2 eV). Thus, these methods were similar to photoionization detection as used with GC. In the majority of cases the liquid eluant from the LC column was completely vaporized before it entered the ionization region, and ionization took place in the vapour phase. However, one of these studies involved direct photoionization of the liquid-phase eluant (Locke, D. C., Dhingra, B. S., Baker, A. D. Anal. Chem. 1982, 54, 447–450.)

When trace levels of analyte must be detected in the presence of a great excess of carrier gas or solvent, and ion current alone is being measured, it is essential that photoionization be selective. Otherwise, ions generated from the carrier gas or solvent could overwhelm the analyte ions of interest. However, this requirement may be obviated if a mass analyzer is used to separate the photoions prior to detection, i.e. so as to separate desired analyte ions from other ionized species, such as those arising from solvent molecules or any impurities.

There is also a small number of reports of APPI combined with mass spectrometry. The inventors are aware of only three reports of true mass analysis of photoions created at atmospheric pressure (Revel'skii, I. A.; Yashin, Vosnesenskii, V. N.; Y. S.; Kurochkin, V. K.; Kostyanovksii, R. G.; Izv. Akad. Nauk SSSR, Ser. Khim. 1986, (9) pp. 1987–1992; Revel'skii, I. A.; Yashin, Y. S.; Kurochkin, V. K.; Kostyanovksii, R. G.; Chemical and Physical Methods of Analysis 1991, 243–248 translated from Zavodskaya Laboratoiya 1991, 57, 1–4; Revel'skii, I. A.; Yashin, Y. S.; Voznesenskii, V. N.; Kurochkin, V. K.; Kostyanovksii, R. G. USSR Inventor's certificate 1159412, 1985), although there have been numerous examples of APPI coupled with ion mobility spectrometry (IMS) (Baim, M. A., Eatherton, R. L., Hill Jr., H. H. Anal. Chem. 1983, 55, 1761–1766; Leasure, C. S., Fleischer, M. E., Anderson, G. K., Eiceman, G. A. Anal. Chem. 1986, 58, 2142–2147; Spangler, G. E., Roehl, J. E., Patel, G. B., Dorman, A., U.S. Pat. No. 5,338,931, 1994; Doering, H.-R.; Arnold, G.; Adler, J.; Roebel. T.; Riemenschneider, J.; U.S. Pat. No. 5,968,837, 1999). In the three papers describing APPI-MS experiments that established the feasibility of the combination, direct analysis was performed of a gaseous mixture of samples in a flow of helium carrier gas. A hydrogen discharge lamp (hn=10.2 eV) was utilized to create ions from the gaseous mixture for analysis by a quadrupole mass spectrometer. Significantly, the relative abundance of sample ions in the spectra obtained of the sample mixture was found to depend upon sample concentration. At high sample concentrations, ion-molecule reactions, particularly charge (electron) transfer, distorted the appearance of the mass spectra: this charge transfer caused the majority of charge to be transferred to the species with the lowest IP. Another finding was that predominantly molecular or quasi-molecular ions are created by PI at atmospheric pressure, indicating that little fragmentation occurs during the ionization step. Finally, when solvent vapour (water or methanol) was introduced into the sample mixture carried in the helium stream, a decrease in sensitivity for the method was observed.

With regard to the prospect of combining APPI with LC-MS, the finding that the presence of solvent vapour decreases the efficiency of ion formation is troublesome. This effect was known to the last researchers to study PID-LC, who described how vaporized solvent molecules absorb the photons, thereby decreasing the flux available to create photoions from the sample (De Wit, J. S. M., Jorgenson, J. W. J. Chromatogr. 1987, 411, 201–212). Another interesting observation from the early APPI-MS studies is the effect that charge-transfer reactions have on the final appearance of the spectra. This observation tells of the fact that the relative abundance of ions in an APPI spectrum will depend upon the reactions that the original photoions undergo prior to mass analysis. As is generally true for atmospheric pressure ionization methods, the high collision frequency insures that species with high proton affinities and/or low ionization potentials tend to dominate the positive ion spectra acquired, unless special measures are taken to sample the ions from the source before significant reactions occur. (In the case of negative ion atmospheric pressure ionization, molecules with high gas phase acidity or high electron affinity dominate the negative ion spectra.)

Many conventional LC-MS instruments rely on a corona discharge to promote ionization. A common configuration provides a heated nebulizer, known to those skilled in the art, for nebulization and vaporization of a sample solution, with the sample being introduced subsequent to a liquid chromatography step. The sample may also be introduced subsequent to a different liquid phase separation method, or from a liquid feeding device not involving a separation step (see the discussion of the preferred embodiment below).

A corona discharge (CD) has its own unique requirements. In the CD source, a high potential is necessary to create and maintain the discharge, which imposes restrictions on the use of separate ion transport mechanisms. A tube cannot be used to transport ions from the CD, because in order for a transport tube to have any effect it must be in close proximity to the ion source; in fact, it must enclose it. However, in order for the CD source to function, a strong electric field must be present at the needle tip, and if this field is maintained by applying the potential between the needle and the transport tube, then the ions produced will be quickly lost to the tube, due to the acceleration from the electric field; conversely, if the tube is held at a potential close to that of the needle, then ion loss from the above mechanism will be minimized, but few ions will be created, because of the lack of a suitably high field around the needle.

APCI can also be initiated by high energy electrons emitted from a radioactive 63Ni foil placed inside a narrow tube in an arrangement similar to the electron capture detector for GC. A 63Ni foil was successfully used in one of the early applications of atmospheric pressure ionization-mass spectrometry as a detector for LC (Horning, E. C., Carroll, D. I., Dzidic, I., Haegele, K. D., Horning, M. G., Stillwell, R. N., J. Chromatogr. Science 1974, 12, 725–729). However, a serious practical disadvantage of a 63Ni foil is the need for compliance with precautions and legal regulations concerning radioactive material.

No such restrictions are present in the APPI source, because the ionization is independent of the potential that the device is maintained at, and no radioactive materials are employed. This allows the position and shape of the transport tube to be selected without regard to maintaining a stable discharge (a further limiting factor of the CD source). Moreover, the potential on the tube can be controlled independently to optimize the transport of ions towards the sampling orifice. An additional electrostatic ion focussing element, or elements, may also be added to the ion source without affecting the ionization process, a unique feature of APPI (this is not practical for corona discharge or electrospray ionization).

For APPI, ion-molecule reactions occur in the transport tube between the dopant photoions, solvent molecules, and analyte molecules, with the net result being that charge is transferred to the analyte molecules (when favourable thermodynamic conditions exist).

The idea of using a dopant to increase the efficiency of ion formation by APPI is not entirely without precedent, as there have been several reported instances where dopants have been used with atmospheric pressure ionization. For instance, the use of acetone and toluene as dopants to enhance the sensitivity of PI-IMS has been described in patent application (WO 93/22033) and in U.S. Pat. No. 5,968,837. Also, charge-exchange reactions involving benzene have been successfully exploited to increase the sensitivity of corona discharge ionization towards samples with low proton affinity (Ketkar, S. N., Dulak, J. G., Dheandhanoo, S., Fite, W. L. Anal. Chim. Acta. 1991, 245, 267–270). To the inventors' knowledge, a dopant has never before been used to enhance the production of photoions from the eluant of a liquid chromatograph.

SUMMARY OF THE INVENTION

What the present inventors have realized is that, while post-ionization reactions may complicate the analysis of APPI mass spectra, these reactions can be exploited to provide enhanced sensitivity. Where PI of vaporized LC eluants is undertaken, as described above, the direct PI of an analyte molecule is a statistically unlikely event, because of the excess of solvent molecules that may also absorb the limited photon flux. The lamps used to date for PI-LC have all had photon energies below the IP's of the most commonly used LC solvents. This does substantially prevent ionization of the solvent, but nonetheless the solvent still absorbs the radiation preventing ionization of the desired analyte. Hence, the total ion production in these experiments has been quite low.

The present inventors have additionally realized that the number of ions produced by a discharge lamp can be greatly increased if the percentage of ionizable molecules in the vaporized LC eluant is raised to a significant fraction of the total. There are two means by which this can be achieved: 1) use a higher energy discharge lamp, so that the solvent molecules themselves are ionized; and, 2) add a large quantity of a dopant, having an IP below the photon energy, to the liquid eluant, or to the vapour generated from the eluant. If the recombination energy of the selected ionizable molecule is relatively high, or if its proton affinity is low, then the photoions of this molecule may react by proton or charge transfer with species present in the ionization region. For negative analyte ion formation, other mechanisms may be responsible, among others resonance electron capture, dissociative electron capture, ion pair formation, proton transfer and electron transfer. Because the ionization region is at atmospheric pressure, the high collision rate will ensure that the charge on the photoions is efficiently transferred to the analyte, provided that the thermodynamics are favourable. (Clearly, any number of competing reactions may also occur, depending upon the impurities present in the reaction region.)

There is a practical problem with using the first method (1) described above for increasing ion production, and that is the present lack of a window material that is both transparent to the requisite high energy photons, and stable in the presence of water. Also, the use of a higher energy lamp is necessarily accompanied by a loss of selectivity in ionization. For many applications, though, high selectivity is not desirable, because in case of unknown sample components, a universal, nonselective ionization method is desired. The present invention envisages exciting the solvent itself by using a suitable lamp. The benefit of the second method, (2) above, apart from the stability of the lamp window, is that the initial reagent ions can be selected; this is still possible with (1), but with fewer possibilities.

Additionally, the present invention can employ all lamp types for PI, pulsed as well as continuous output; the preferred embodiment utilizes a continuous lamp. The PI is then applied to LC (all liquid sample methods, whether or not separation is involved), with any suitable mass analyzer (triple-quadrupole, single-quadrupole, TOF, quadrupole-TOF, quadrupole ion trap, FT-ICR, sector, etc.).

Hence, possible mechanisms of ionization include: direct PI of vaporized analyte, ionization by ion-molecule reactions following PI of dopant in eluant, ionization by ion-molecule reactions following PI of solvent where the solvent acts as a dopant, etc. It does not matter which lamp is used for any of these, provided that the lamp's energy is sufficient to ionize at least one major component of the eluant, or of the vapour generated from the eluant (the dopant can be introduced separately as a gas).

Windows made of lithium fluoride are optically transparent up to around 11.8 eV, and are used for argon lamps that can provide photons of 11.2, 11.6, and 11.8 eV (depending upon the lamp design). However lithium fluoride is hygroscopic, and these windows deteriorate quickly when exposed to moisture, a problem exacerbated by elevated temperatures. Consequently, due to the high water content in most LC solvent systems, and the high temperature required to vaporize the solvent, a lamp equipped with a lithium fluoride window may be expected to have only a limited useful lifetime. Nevertheless, it is conceivable that an argon discharge lamp could be used as a photoionization source for LC, but, if in the absence of a dopant, only if a major component of the solvent (e.g. methanol, ethanol, or isopropanol) is ionizable by the lamp, and then only if special precautions are taken to protect the lamp's window. An argon lamp can also be used in the manner of method (2), where no major component of the solvent itself is ionizable by the lamp, but a dopant is added. It should also be recognized that new window materials may become available, which would overcome the limitations of present lithium fluoride windows. Also, PI will conceivably work with windowless light sources if these become available.

The second method described above for enhancing ion production by APPI can eliminate the requirement for a lamp with a lithium fluoride window, by choosing a dopant species with a lower IP, so a different light source can be used. For example, for a dopant ionizable by 10 eV photons that has a suitably high recombination energy or low proton affinity, then a krypton discharge lamp may be used. Krypton lamps are usually equipped with magnesium fluoride windows that are much more stable in the presence of water vapour, and are optically transparent up to 11.3 eV. With a krypton lamp, it is possible to selectively ionize a dopant in the presence of solvent molecules, which provides the opportunity to gain some control over the ion-molecule chemistry in the ion source. The selectivity offered by this approach, along with the longer lifetimes anticipated for lamps equipped with magnesium fluoride windows, make the use of a dopant in combination with a lamp with a magnesium fluoride window the preferred method of implementing APPI in conjunction with LC-MS.

Lamps filled with argon or krypton are commercially available and are given as examples in the discussion above; lamps filled with other gases, producing the desired photon energies may be used equally well.

An advantage of the method of the present invention is that the sensitivity does not depend greatly on lamp current, which is inversely related to lamp lifetime; i.e., the lamp can be run at low powers without a great sensitivity drop (perhaps 10–15% difference in sensitivity between 0.4 mA and 2 mA). Consequently, the method provides the unanticipated benefit of being relatively economical. Without a dopant, sensitivity is proportional to lamp current; the mechanism responsible for the difference is as yet undetermined.

It is envisaged that irradiation of the sample will usually take place in the vapour phase, and that this will be the most efficient technique for most samples. However, it is possible to photoionize the liquid (Locke, D. C., Dhingra, B. S., Baker, A. D. Anal. Chem. 1982, 54, 447–450) before nebulization and vaporization. There are several factors to consider: 1) liquid phase solvent molecules have lower IP's than isolated gas phase solvent molecules, and direct PI of most solvents will result with 10 eV photons; hence, a LiF window is not required; 2) Ion-electron recombination is much faster in the liquid phase so sensitivity will likely suffer; 3) direct contact between liquid and lamp window may hasten the rate of window deterioration. Based upon these factors, the method of the present invention can conceivably be applied in a manner either utilizing direct PI of liquids, followed by nebulization and vaporization, or utilizing PI of droplets created by nebulization, followed by vaporization. During the vaporization step, ions can be liberated from droplets in some arrangement similar to that utilized in the SCIEX TurboIonSpray ion source. However, the inventors do not believe that it would work as well as the preferred embodiments of the invention, as described below.

In accordance with a first aspect of the present invention, there is provided a method of analyzing a sample of an analyte, the method comprising:

(1) providing a sample solution comprising a solvent and an analyte as a sample stream;

(2) providing a dopant in the sample stream;

(3) forming a spray of droplets of the sample stream, to promote vaporization of the solvent and the analyte;

(4) vaporizing the droplets in said spray whereby the sample enters the vapour state;

(5) after step (2), in a region at atmospheric pressure, irradiating the sample stream with radiation to ionize the dopant, whereby at least one of subsequent collisions between said ionized dopant, and said analyte and indirect collisions of said analyte with solvent molecules acting as intermediates, results in ionization of said analyte; and (6) passing the ions into the mass analyzer of a mass spectrometer for mass analysis of the ions.

The method can include, in step (5), irradiating the sample stream before step (4), to effect irradiation in the liquid state, or alternatively, irradiating the sample stream after step (4), to effect irradiation in the vapour state.

The step (2) of providing a dopant can comprise one of adding a separate dopant and utilizing the solvent as the dopant and the dopant can provided in one of the liquid state and the vapour state.

The method preferably includes providing a guide for guiding the sample stream in steps (3), (4) and (5), and this can be provided with an end shaped to promote focusing of the ions.

The method can include providing additional electrostatic focusing elements and a potential between a zone where the sample stream is irradiated in step (5) and the inlet of the mass spectrometer.

It is believed to be preferable to cause the sample stream to flow in a first direction in steps (3), (4) and (5), and in step (6) to pass the ions into a mass analyzer in a second direction, generally orthogonal to the first direction. However, the method also includes passing the sample stream in essentially the same direction in all of steps (3), (4), (5) and (6).

The method can be used to form either positive ions or negative ions in step (5).

The method can be effected on a sample solution including a plurality of analytes whereby all of said analytes are ionized to at least some extent, the method further including subjecting the analyte ions to a mass spectrometry step, to separate and to distinguish the different analytes.

The method can be effected on a sample solution which includes, prior to step (3), subjecting the sample stream to liquid phase separation, to separate said analyte from other substances.

Another aspect of the present invention provides an apparatus, for irradiation of a sample stream, formed from a sample solution including a relatively large amount of some ionizable species and a relatively small amount of an analyte to be ionized, the apparatus comprising:

spray means for forming a spray of droplets from the sample stream for vaporisation of the sample stream;

dopant supply means for supplying dopant to the sample stream; and a means for irradiating the sample stream in a region at atmospheric pressure, to ionize the ionizable species at atmospheric pressure whereby at least one of: subsequent collisions between said ionized species and the analyte; and intermediate reactions between the ionized species and the analyte, results in charge transfer and ionization of the analyte; and a mass spectrometer for determining the mass-to-charge ratio of the ions formed by irradiating the sample stream.

Preferably, the means for irradiation comprises a lamp, selected to provide photons having energy sufficient to ionize the ionizable species.

It is possible for the means for irradiating to comprise a laser.

BRIEF DESCRIPTION OF THE DRAWING FIGURES

Figure 2A:
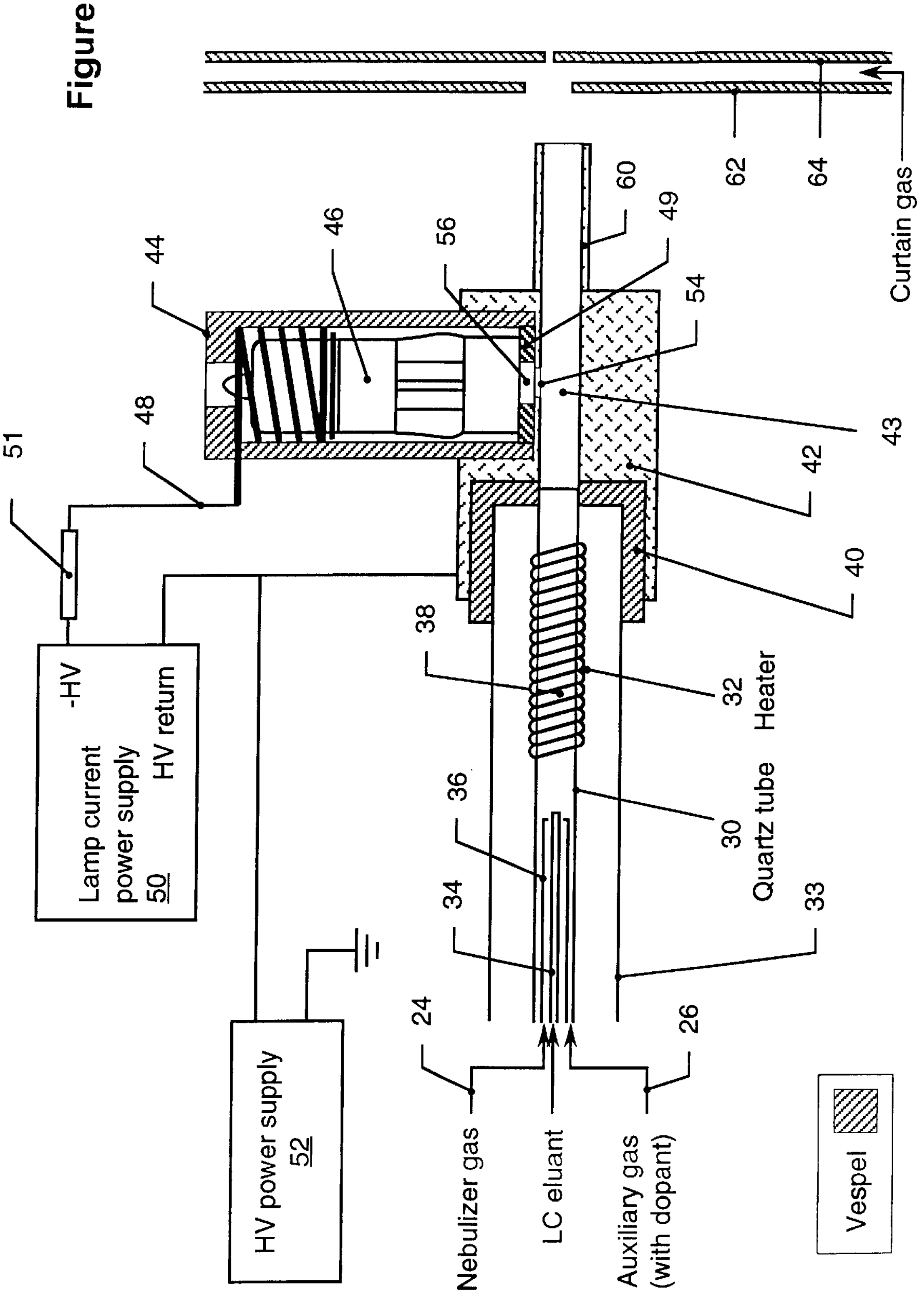

For a better understanding of the present invention and to show more clearly how it may be carried into effect, reference will now be made, by way of example, to the accompanying drawings which show a preferred embodiment of the present invention and in which:

FIG. 1 is a schematic of an apparatus in accordance with the present invention; and FIG. 2*a* is a cross-sectional view through a first embodiment of an apparatus in accordance with the present invention.

Figure 2B:
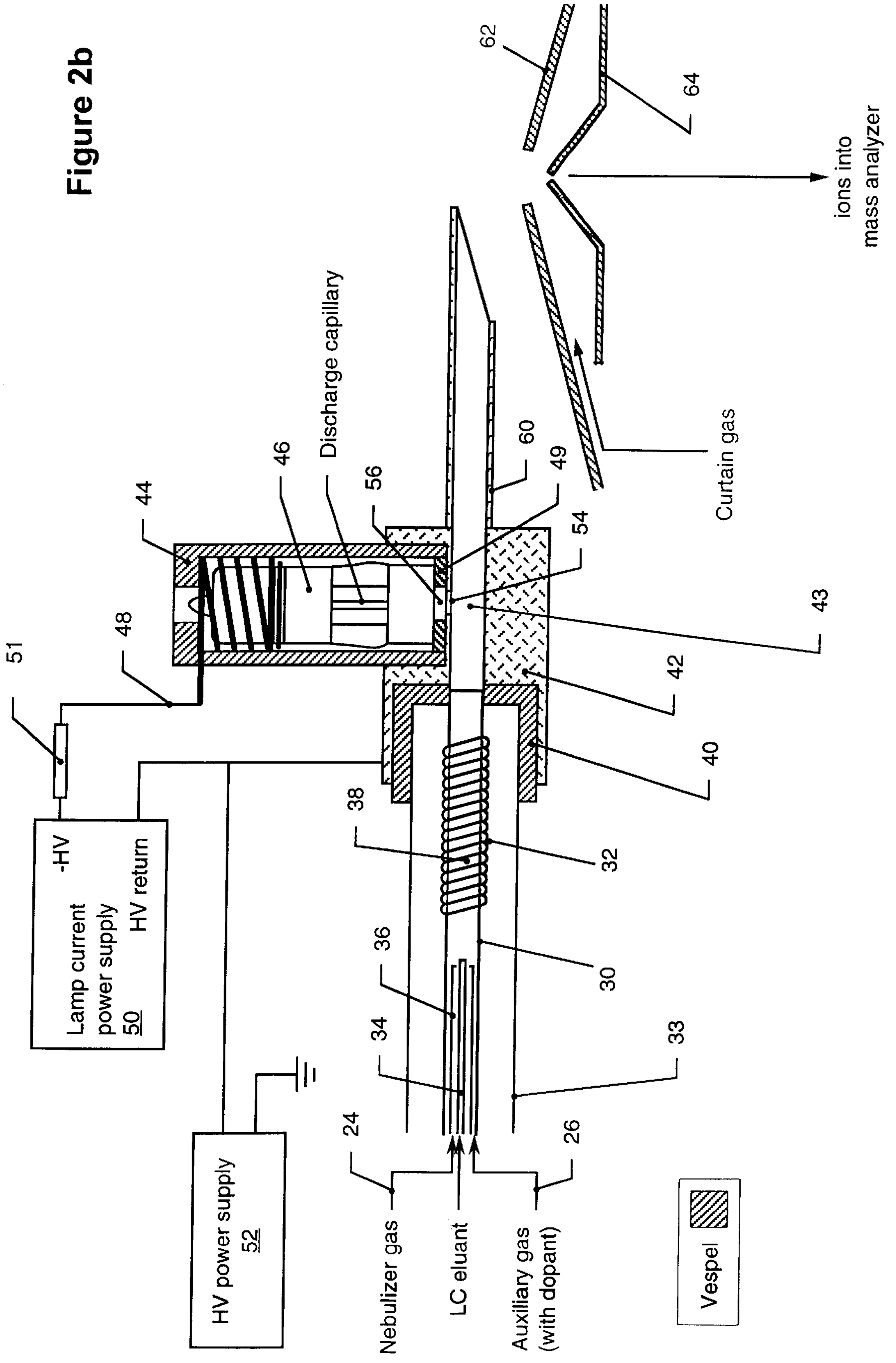
Figure 3A:
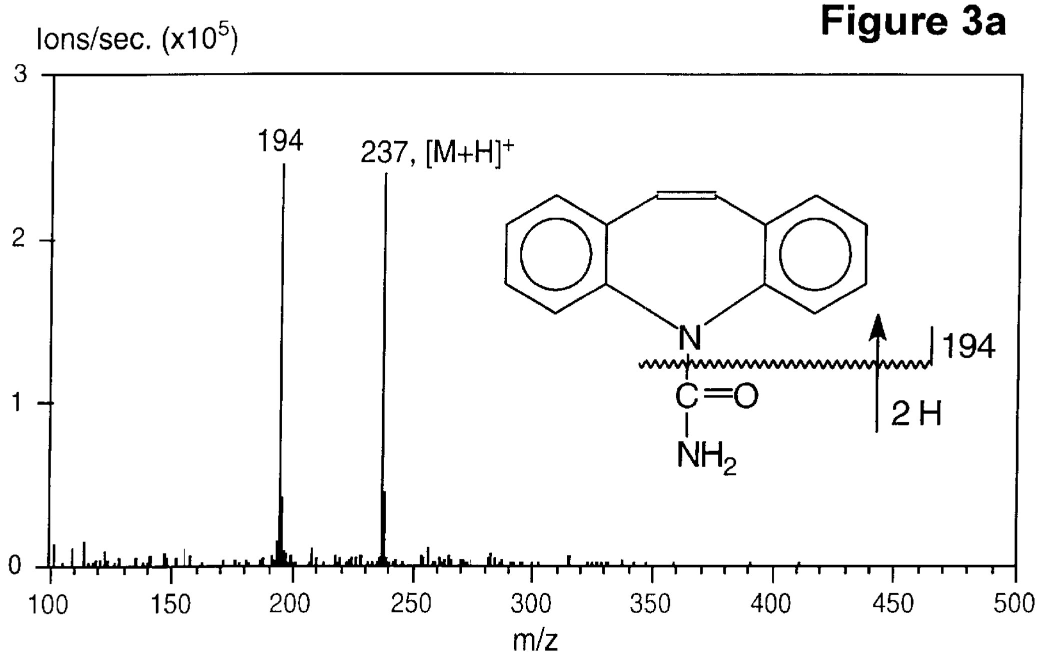
Figure 3B:
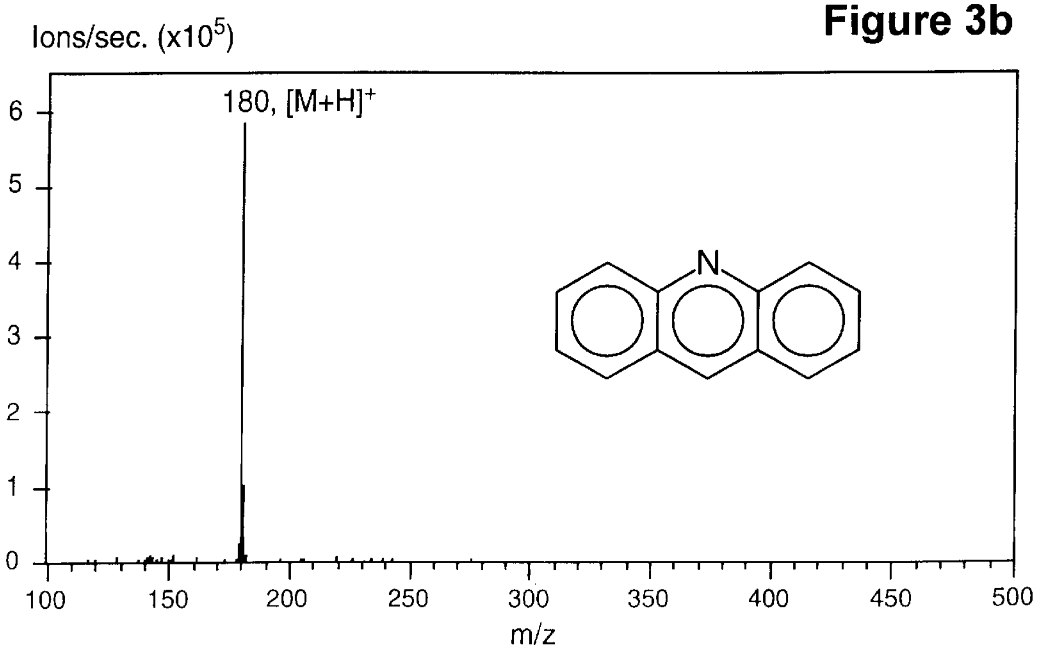
Figure 3C:
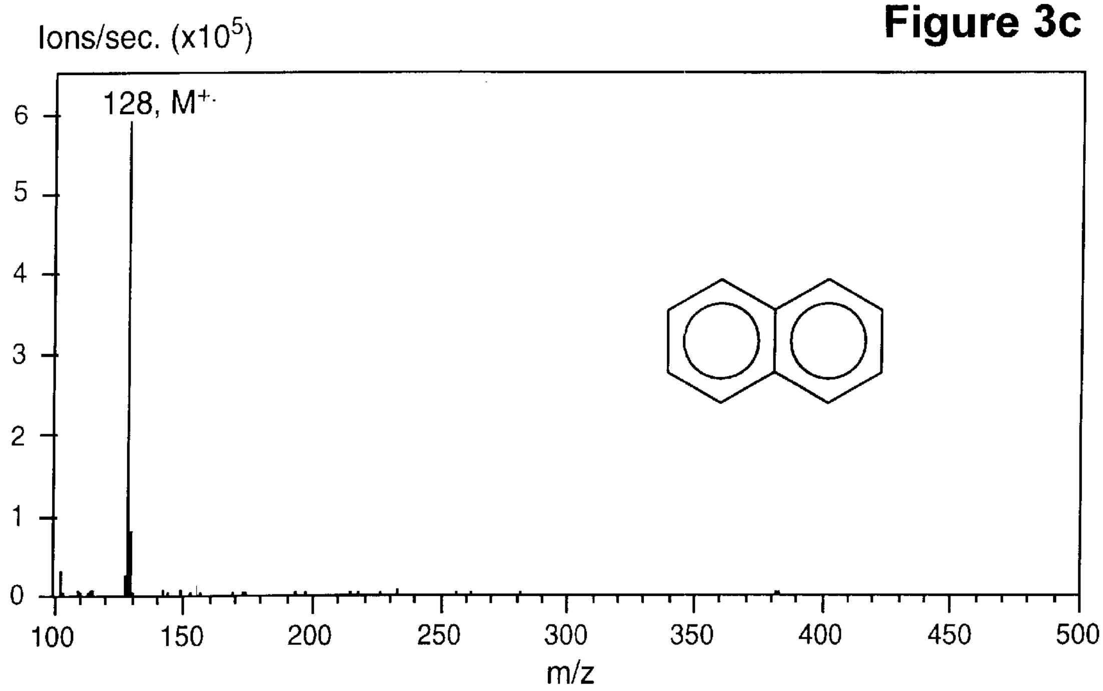
Figure 3D:
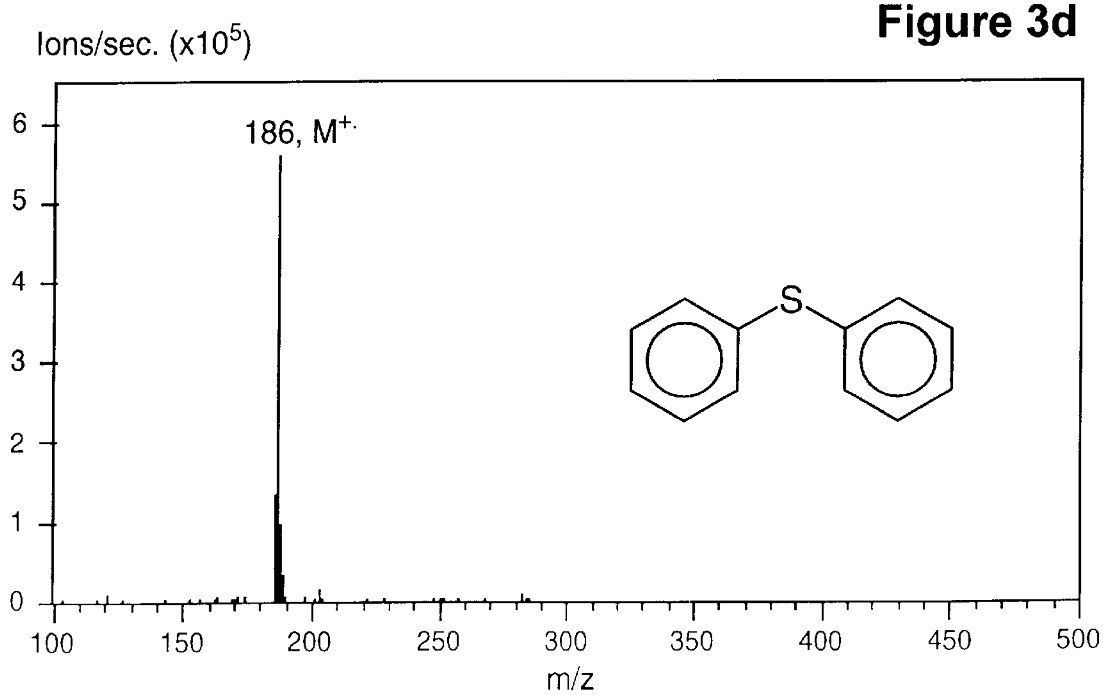
Figure 3E:
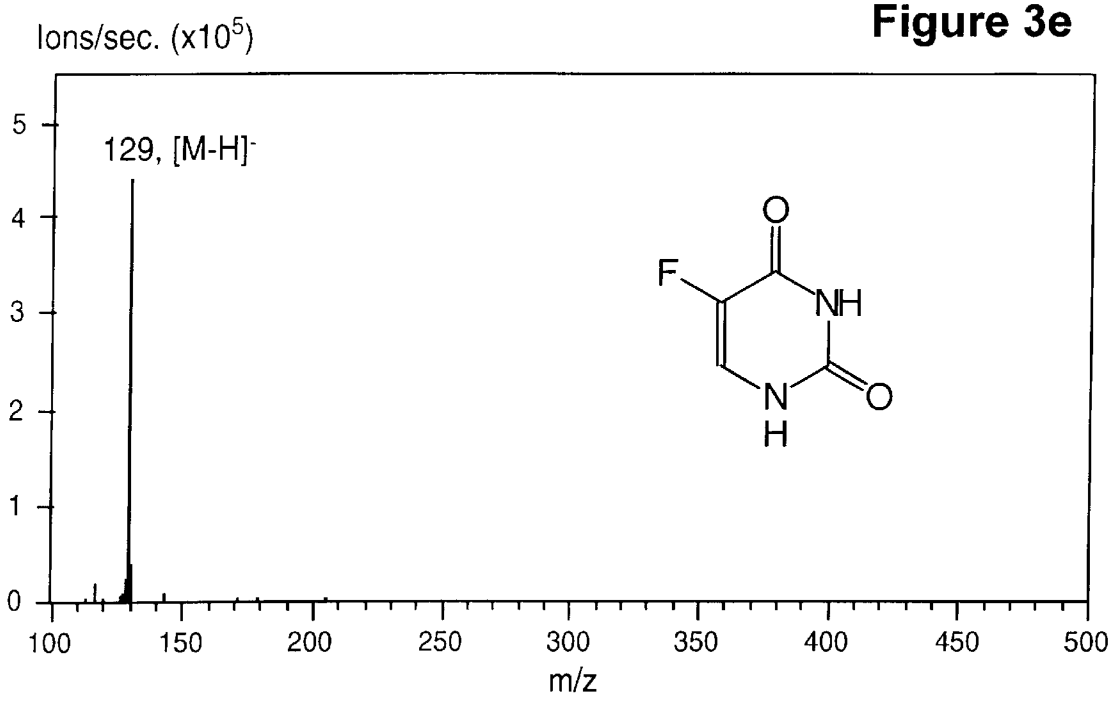

FIG. 2*b* is a cross-sectional view through a second embodiment of an apparatus in accordance with the present invention.

FIGS. 3*a*–3*e* are mass spectra obtained from the apparatus of FIG. 2*a*, showing ionization of different substances.

Figure 4A:
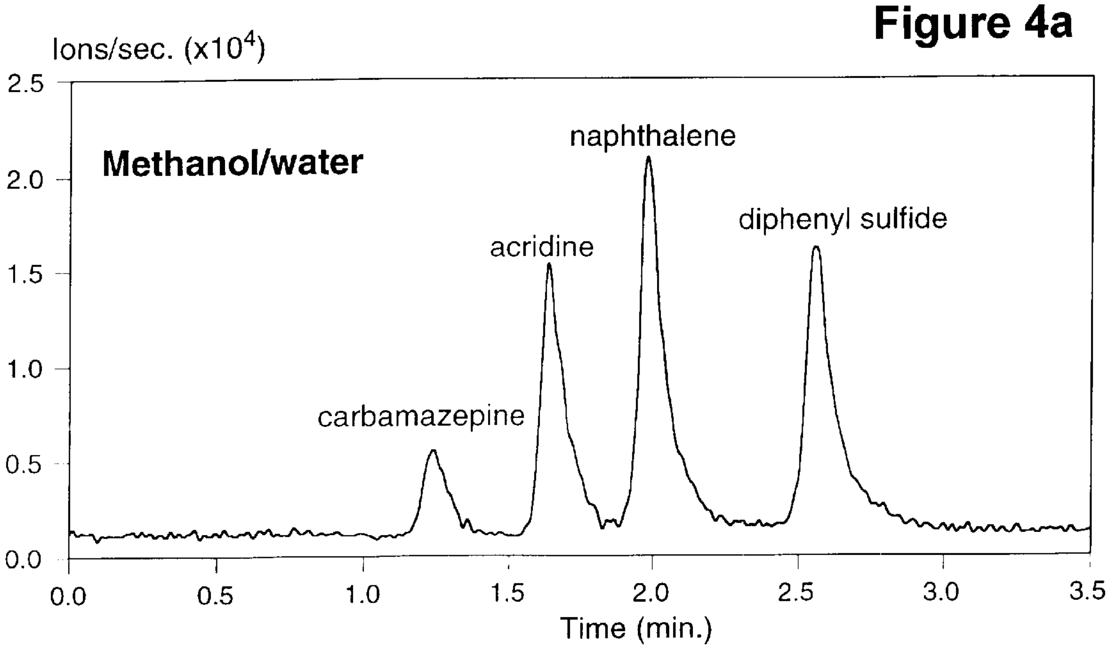
Figure 5:
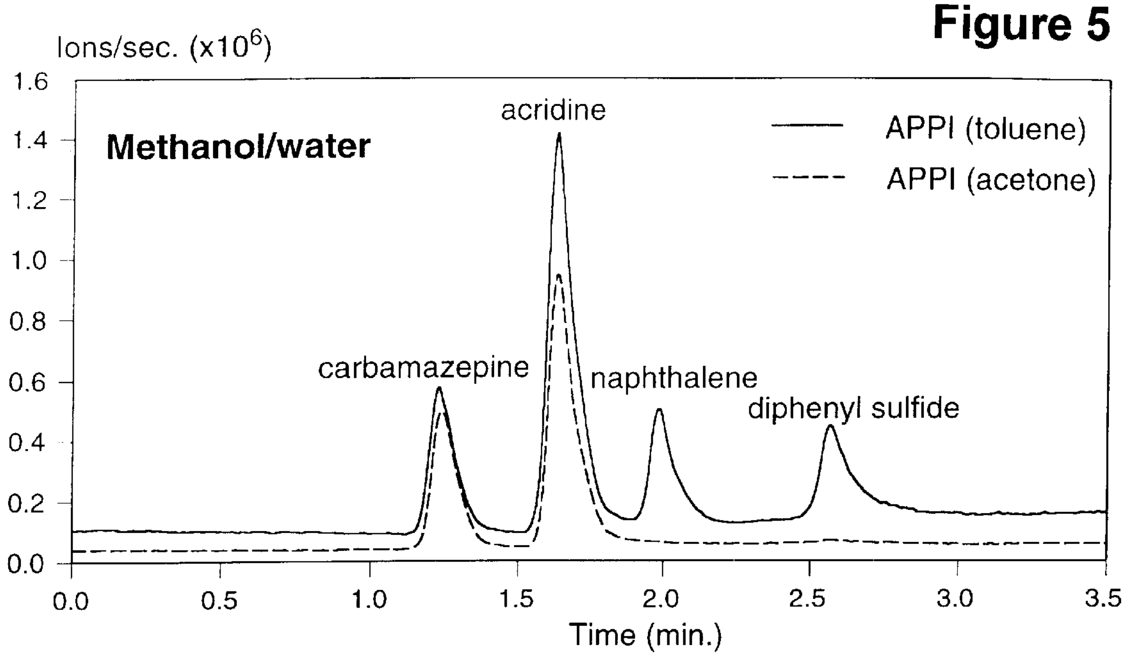
Figure 4B:
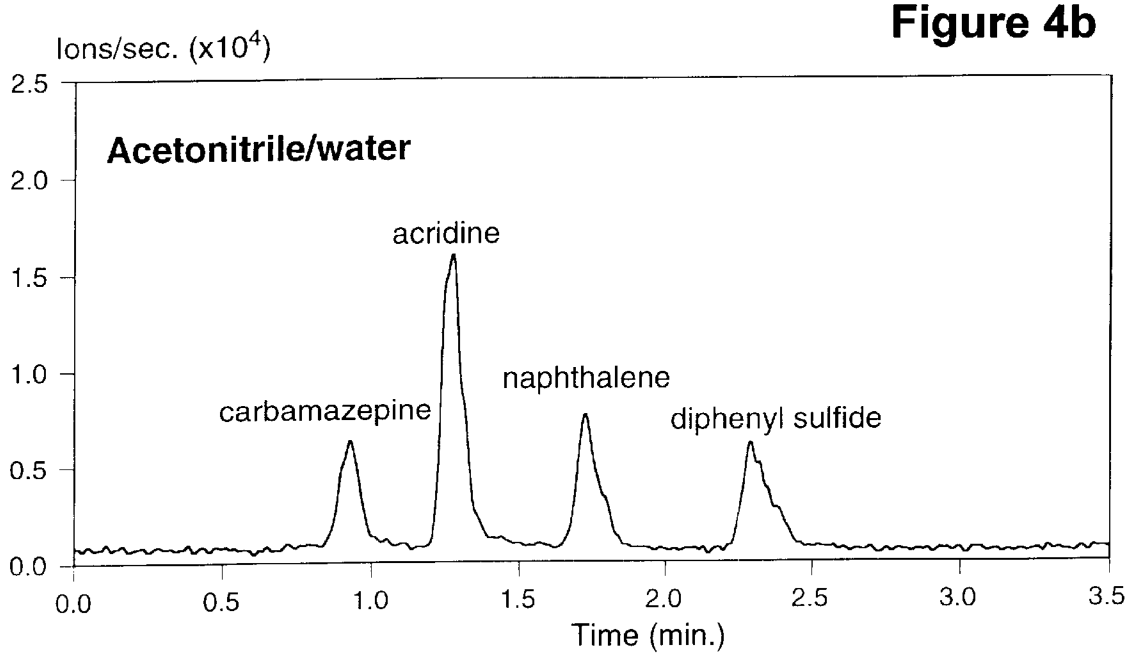
Figure 6A:
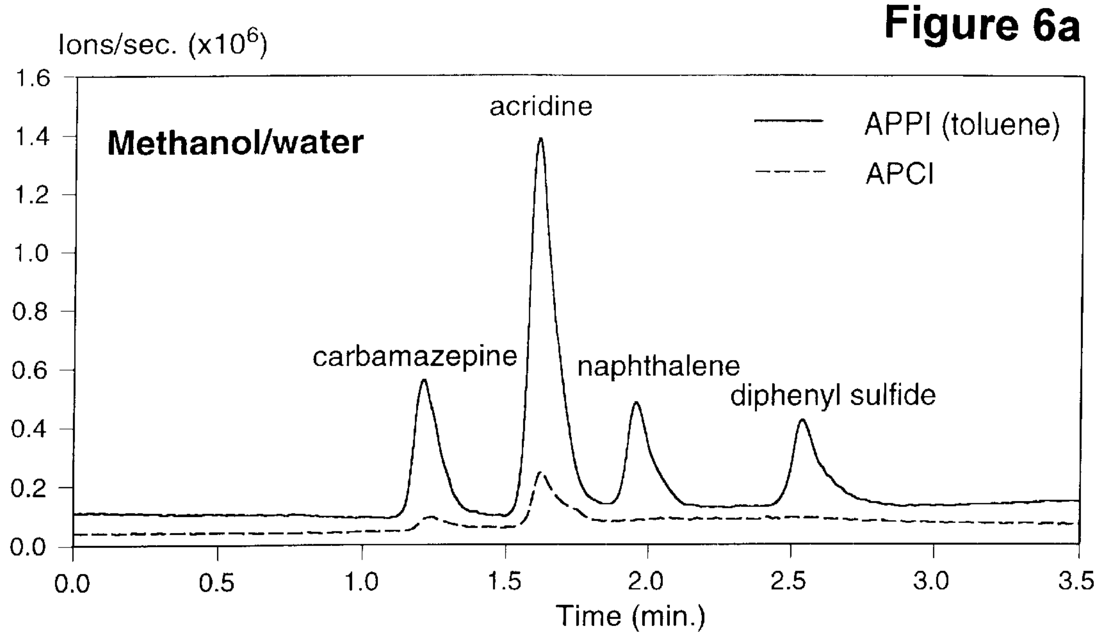
Figure 6B:
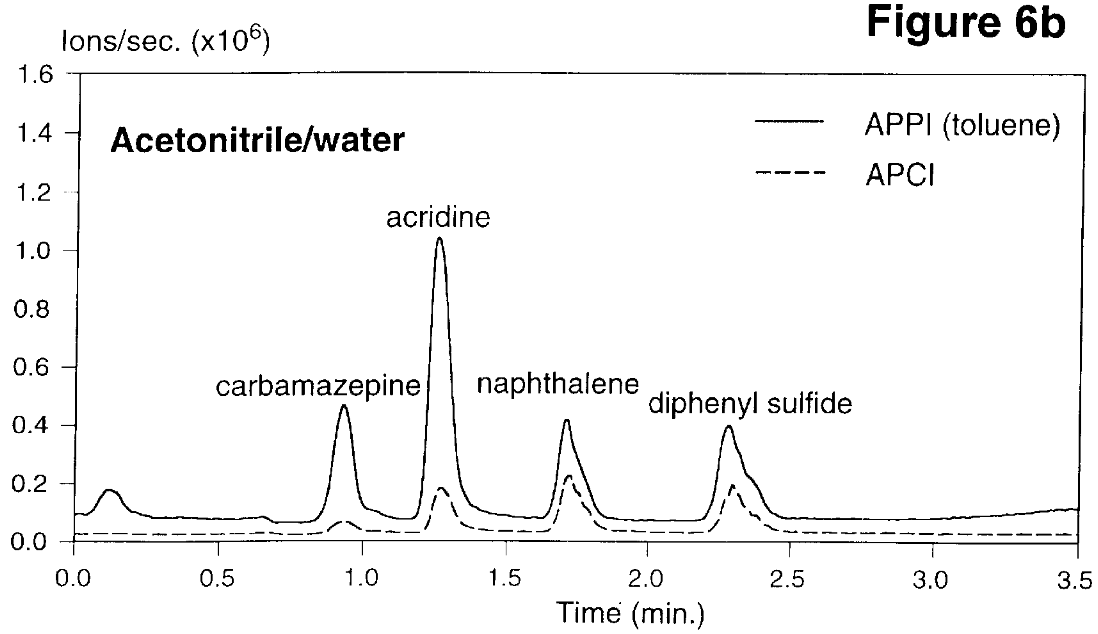

FIGS. 4*a* and 4*b* are ion current chromatograms showing the sum of selected ion currents detected for selected substances in the absence of a dopant;

FIG. 5 is a chromatogram from the same sample solution as used for FIG. 4*a* showing the effect of different dopants; and FIGS. 6*a* and 6*b* are chromatograms comparing APPI with APCI.

DETAILED DESCRIPTION OF THE PREFERRED EMBODIMENT

Referring first to FIG. 1, the apparatus in accordance with the present invention includes a mass spectrometer 10 (here a Perkin-Elmer (PE) Sciex API 365 Triple-Quadrupole Mass Spectrometer). The liquid chromatography section of the apparatus comprises a liquid chromatography column 12 supplied from an auto sampler 14 (here a PE Series 200 Auto Sampler). The auto sampler 14 in turn is connected to and supplied from two pumps 16, 18 (here two PE Series 200 Micro-LC Pumps).

The column 12 (here a Betabasic-18; Keystone Scientific, Inc.; 3 μm particle size; 50 mm length; 2 mm ID) has an outlet connected to a heated nebulizer probe, indicated schematically at 20 in FIG. 1 and described in greater detail below. The heated nebulizer probe 20 is connected through an atmospheric pressure photoionization ion source section 22, again indicated schematically in FIG. 1 and described in greater detail below.

In known manner, a nebulizer gas supply 24 is connected to the heated nebulizer probe 20. An auxiliary gas connection 26 is provided between the mass spectrometer 10 and the heated nebulizer probe 20. A solvent pump 28 (here a Harvard Apparatus model 2400-001 syringe pump) is also connected to the heated nebulizer probe 20, for supply of dopant to the APPI ion source section 22.

It is anticipated that the dopant could be added in a variety of different ways. For example, a dopant vapour could be added to the nebulizer gas, or to the auxiliary gas, or supplied through an independent connection. Also, where a flushing gas is provided to keep the lamp clear (as detailed below), then the dopant vapour could possibly be supplied with that flushing gas. Further, the dopant may be the liquid solvent itself (see following paragraph), or the dopant may be dissolved or mixed in the liquid solvent; this mixing may occur at any step of the process (for example, before the column, after the column, or in the heated nebulizer probe).

In the present invention, a "dopant" means: any species that absorbs incident VUV photons, is ionizable by said photons, and reacts further, with the end result being that a charge may be transferred to the desired analyte. Hence, for some applications, the solvent itself (e.g. methanol) may function as the dopant under certain circumstances (high energy lamp); further, toluene and acetone, the two examples of dopants described here, can both be used as LC solvents for some applications. In other applications, the dopant may be a liquid or volatile solid dissolved in the liquid eluant. The key factor is that the dopant is an intermediate in the process of ionization of the analyte, i.e. it shows a high efficiency for photoionization and high efficiency in transferring a charge to the desired analyte.

Turning to FIGS. 2*a* and 2*b*, which show details of both the heated nebulizer probe 20 and the APPI ion source 22, which includes an apparatus for holding and mounting a lamp 46, and a housing (not shown in FIGS. 2*a* and 2*b*). The APPI ion source 22 was constructed in part from a Heated Nebulizer (HN) atmospheric pressure chemical ionization (APCI) source supplied with the Sciex API 365 mass spectrometer, and makes use of an essentially unmodified heated nebulizer probe 20. The HN-APCI source is modified to enable the technique of the present invention to be effective. This is convenient, because it was anticipated that in order for APPI to be effective, the LC eluant would require vaporization in the same manner as APCI. An additional benefit is that the new ion source 22 can be directly connected with a mass analyzer 10, without having to modify the vacuum interface of the mass analyzer. Additionally, this readily enables comparisons between the new source and the standard Heated Nebulizer-APCI source to be made, since the housings for the two ion sources were essentially identical.

A simple plumbing assembly was utilized to provide the dopant to the heated nebulizer probe. A fused silica capillary tube from the syringe pump was fed into the tube carrying the auxiliary gas in the heated nebulizer. This region is hot, so the dopant is vaporized immediately, and is swept along into the vaporization region, and then the ionization region, by the auxiliary gas flow. There are any number of ways in which the dopant transfer tube can be interfaced with the HN probe, the exact means through which this is achieved are unimportant.

The heated nebulizer probe 20 has a quartz tube 30, and a heater 32 around the quartz tube. Within the quartz tube 30, there is a capillary 34 for eluant from the chromatography column 12. Around the capillary 34, there is a tube 36, defining an annular channel for nebulizer gas, and the nebulizer gas supply is again indicated at 24 in FIGS. 2*a* and 2*b*.

Between the outer tube 36 and the quartz tube 30, there is a further annular channel to which the auxiliary gas supply, again indicated at 26 is connected. It is through this channel that the dopant is introduced to the system.

A nebulizer vaporization chamber is indicated generally at 38.

The entire nebulizer vaporization assembly is encased within a stainless steel cylinder 33, which is attached at one end to the base of the HN probe (through which the various gas and liquid connections are made), and has an opening at the other end out of which the quartz tube extends slightly to permit the flow of vapour.

An insulating sleeve 40 is provided around the end of the cylinder 33 and between the end of the quartz tube 30 and a connection bracket 42. The sleeve 40 is preferably, though not necessarily, made from Vespel™ (supplied by DuPont). The sleeve 40 allows for the connection bracket 42 to be held at a high potential relative to that of the heated nebulizer probe 20, which is grounded. Electrical insulation, not thermal insulation, is the primary function of the sleeve.

A lamp holder 44 is also made of electrically insulating material, again preferably Vespel, and is mounted in a correspondingly dimensioned bore in the connection bracket 42. A lamp 46 is mounted in the lamp holder 44 and includes an electrical cathode connection 48. A lamp power supply 50 is connected to the lamp cathode connection 48 and to the connector bracket 42. The connector bracket 42 is made of a suitably conductive material, here stainless steel. A lamp anode 49 is in electrical contact with connector bracket 42. In known manner, a high voltage power supply 52 is connected between the lamp power supply 50 and ground.

The sleeve 40 was made relatively thick, namely 4 mm, in order to prevent arcing, and also to minimize the likelihood that any thermal degradation of Vespel™ would cause deterioration of the mechanical strength and/or insulating capacity of the sleeve 40. The connector bracket 42 and sleeve 40 are fixed in place on the HN probe 20.

In this preferred embodiment, the lamp 46 was a model PKS 100 krypton-filled direct-current (DC) capillary discharge lamp from Cathodeon Ltd. (Cambridge, England). The high voltage power supply 50 is a model C200 power supply, also from Cathodeon Ltd. This nominally 10.0 eV lamp is equipped with a magnesium fluoride window 56 enabling transmission of 10.0 and 10.6 eV photons. A hole 54 (diameter 4 mm and thickness 0.5 mm ) is provided in the bracket 42. This hole 54 allows for passage of the photons from the lamp window 56 into the central bore 43 of the bracket, 7 mm ID in this embodiment, through which the vapour flows. No measurement was made of either the absolute or relative intensity of the lamp's emissions at the two ionizing wavelengths.

For some applications, where samples can be relatively dirty or impure, it may be desirable to provide a modification of bracket 42 for the passage of some gas as a flushing gas continuously running over the hole 54 or through the hole 54, to keep the lamp window clean.

The power supply 50 was modified and insulated, to enable the power supply 50, together with the lamp 46 and the connector bracket 42 to be floated at voltages up to plus or minus six kilovolts relative to ground, as determined by the high voltage power supply 52.

A current limiting resistor 51 was inserted in series between the negative lead of the power supply 50 and the cathode of the lamp 46 as recommended by Cathodeon, allowing for control of the lamp current and hence photon flux. For the APPI experiments described here, the resistance was set at 1 MΩ, yielding a lamp current 0.70 mA (and for comparison, without the extra resistance, the lamp could be driven at approximately 2.2 mA).

The connector bracket 42 includes a guide tube 60 for guiding flow of ions generated by the nebulizer 20. The first embodiment of FIG. 2*a* shows the guide tube oriented in a straight-on relationship with the sampling orifice; i.e., the gas flow is guided directly into the sampling orifice. This is the embodiment on which experimental work, detailed below, has been performed. A preferred and second embodiment is shown in FIG. 2*b* and has the guide tube 60 oriented in an orthogonal relationship with respect to the curtain plate and sampling orifice, so that the direction of the gas flow is parallel to the front of the curtain plate, not directly towards it. This preferred arrangement has the benefit that neutral contaminants will not be as likely to foul the sampling orifice. The direction of gas flow does not need to be parallel, or perpendicular to the curtain plate: any conceivable orientation can be used (though the preferred remains nearer to the orthogonal case). One or more additional electrostatic focussing element(s) may be incorporated into any APPI source utilizing this orthogonal or other preferred configuration, in order to bend the trajectories of the analyte ions, but not the neutral contaminants, which are unaffected, into the sampling orifice. Further, the method is not limited to instruments where a curtain plate is utilized; the method can be applied with any mass analyzer that makes use of an interface between a high pressure region, commonly atmospheric pressure, into a vacuum region, regardless of the means by which this is achieved.

For simplicity, like components are given the same reference in FIGS. 2*a* and 2*b*, and the description of these components is not repeated.

FIGS. 2*a* and 2*b* also show certain conventional components of the PE-Sciex triple-quadrupole. mass spectrometer. Thus, there is a curtain plate 62, and behind the curtain plate 62, an orifice plate 64. In known manner, a curtain gas, usually dry nitrogen, can be supplied between the curtain plate and orifice plate to prevent (or at least reduce) passage of solvent into the vacuum of the mass spectrometer. Thus, in known manner, ions pass through the curtain and orifice plates 62, 64 into the mass spectrometer for analysis. Curtain plate, curtain gas, and orifice plate are elements of the arrangement for guiding ions from an atmospheric pressure ionization source into the vacuum of a mass spectrometer as implemented in Sciex mass spectrometers and are given as a reference. Mass spectrometers equipped with other elements for transport of ions from an atmospheric pressure ionization source into the vacuum can be used equally well for mass analysis of ions generated, as described above and in accordance with the present invention, by photoionization at atmospheric pressure.

With the new ion source, experiments were performed to demonstrate the increase in APPI-LC-MS sensitivity that can be obtained for various sample types through the use of a dopant; two dopants, toluene and acetone, were tested for their utility in this regard. Further, in order to evaluate the relative sensitivity of the APPI method, all the samples used for the APPI experiments were also analyzed via an additional, unmodified, HN-APCI source. Finally, because solvent composition is an important variable that may affect ionization efficiency, all the LC-MS experiments were repeated with the two most commonly used solvent combinations: methanol/water and acetonitrile/water.

The sensitivity of the method was found to depend upon the offset potential applied to the lamp 46 and the connector bracket 42 with respect to the curtain plate 62 of the mass analyzer 10. As the tube 60 is effectively an extension of the bracket 42, the elements 42, 46, and 60 are subject to the same offset potential. During normal operation of the API 365 mass spectrometer, the potential applied to the curtain plate had a set value of 1.0 kV, relative to ground, the polarity being the same as that of the ions being analyzed. The additional HV power supply, Nermag (France), model INP 156, was used to provide the lamp offset potential. In general, the optimum value for the lamp offset potential appeared to be related to the separation of the connector bracket 42 from the curtain plate 62, with the condition that its magnitude remain at least slightly above that of the curtain plate 62, indicating that the important parameter is the electric field strength. This characteristic has not been studied thoroughly, has not been proven, and is not yet fully understood. For the experiments described in this paper, the end of the tube 60 was fixed at a position only a few mm in front of the curtain plate 62, the optimum offset potential was +1.2 kV for positive ions, i.e. 200 V above that of the curtain plate. In negative ion mode, high sensitivity could be achieved by simply switching the polarity of lamp offset potential, after its magnitude had been optimized for positive ion analysis. The shape of tube 60 can be varied in many ways to optimize the transportation of ions into the orifice and/or to reduce or eliminate the penetration of unionized material solvent or analyte or contaminants into the orifice in plate 64.

Electrical connections to the lamp were made through the side of the housing of the APPI source 20. The original HV connection for the corona discharge needle was replaced with a two-pin connector; one connection was made to the ring cathode of the lamp (negative HV from power supply 50), via electrical connection 48, and another was made to the body of the connector bracket 42 (HV return from power supply 50), which was in electrical contact with the anode 49 at the base of the lamp 46. The new connector was installed in a manner such that the source housing retained its seal, so that ambient air was excluded from the ionization region.

The PE SCIEX API 365 triple-quadrupole mass spectrometer 10 used for these experiments was essentially unmodified, with the only significant changes being those made to one of the HN ion sources, as described above. System control and data acquisition was accomplished using the MassChrom version 1.0 data system. Single MS mode only was used for the experiments described here. The mass spectrometer was tuned with the LC2Tune 1.3 instrument control and data acquisition software to provide optimum sensitivity for each analyte using direct sample infusion and selected ion monitoring (SIM). Also using the LC2Tune software, full scan spectra were obtained for each analyte using the instrument state files established during optimization. The following parameters were used for the full scan experiments: start mass, 30 amu; stop mass, 500 amu; step, 1 amu; dwell time, 5 ms; peak hopping, on; and, pause time between scans, 5 ms. For the mixture analysis experiments, Sample Control (version 1.3) software was used. In these experiments, SIM of each of the four analytes was performed, with the dwell time at each mass being 200 ms; for each ion monitored, the voltages of the mass spectrometer were set to the optimum values that were predetermined using the LC2Tune software.

During the experiments comparing the APPI and APCI ionization methods, the operating parameters of the mass spectrometer, including the temperature and gas flow settings for each heated nebulizer probe, were unchanged. The needle current utilized for the APCI experiments was set to 2.5 μA.

The heater temperature of the heated nebulizer probe was maintained at 450° C.

Chemicals

Carbamazepine, acridine, naphthalene, phenyl sulfide, and 5-fluorouracil (5FU) were purchased from Aldrich, and used without further purification. Concentrated stock solutions were made up for each of these samples in methanol.

For the full scan experiments, where each sample was to be analyzed individually, dilute methanol/water solutions (50/50 by volume) were made up for each of the samples. The concentration of the carbamazepine solution was the same as that of acridine, 0.2 μM; likewise, the concentrations of the naphthalene and diphenyl sulfide solutions were both 20 μM. The concentration of the 5FU solution was 1 μM. For the SIM mixture analysis experiments, another methanol/water solution (50/50) containing all the above samples (with the exception of 5FU) was prepared such that the final concentrations of carbamazepine, acridine, naphthalene and diphenyl sulfide were 0.2 μM, 0.2 μM, 20 μM and 20 μM respectively.

Liquid Chromatograph

For all the experiments described here, the eluant flow was provided by the high-pressure-mixing gradient HPLC system consisting, in known manner, of two PE micro-LC pumps 16, 18. Pump 16 was used to deliver water, while pump 18 was used for the organic mobile phase, either methanol or acetonitrile. All solvents were sparged with helium before and during the experiments. No buffers or other additives were used in the experiments presented here, which does not imply that buffers and additives are generally incompatible with APPI. A total flow rate of 200 μl/min was used in combination with a 2 mm i.d. HPLC column. Samples were injected in known manner by means of a 5 μl sample loop installed in autosampler 14.

The column was Betabasic-18, 3 μm particle size; 50 mm length; 2 mm i.d. from Keystone Scientific, Inc. The dopant was delivered from a 1 ml Hamilton gastight syringe at 25 μl/min. via the Harvard Apparatus syringe pump. All solvents used, including the dopants, were of HPLC grade.

For the full scan experiments, the samples were injected on column and eluted using isocratic conditions. Methanol/water was the mobile phase used in the full scan experiments whose data are presented here; the methanol/water ratio for each analysis was set so that acceptable peak shapes and short retention times were achieved. For carbamazepine, acridine, naphthalene, diphenyl sulfide, and 5FU, respectively, the methanol/water ratio used was 60/40, 70/30, 75/25, 80/20, and 70/30.

Gradient elution was employed in known manner for the mixture analysis experiments, using methanol/water, and, on alternate days, acetonitrile/water. Data acquisition was synchronized with the LC gradient program by a trigger sent from the autosampler to the computer at the moment of injection.

Results and Discussion

APPI Mass Spectra

Full scan APPI mass spectra for each of the five analytes listed above are presented in FIGS. 3(*a*)–(*e*). These spectra were obtained by isocratic, on column, analysis of single component solutions. Toluene was used as the dopant. The spectrum shown for each sample was taken from the top of the peak in its chromatogram, and has been background subtracted. The mass range from m/z 30 to 100 has been omitted from the figures, so that the analyte ions, and not incompletely subtracted solvent ions, dominate the spectra.

FIGS. 3(*a*) and (*b*) are spectra of carbamazepine (m/z 236) and acridine (m/z 179), respectively, that clearly show the MH+ ions of each sample. Carbamazepine is a relatively fragile molecule which could not be analyzed by APPI or APCI without inducing thermal degradation, as evidenced by the prominent signal from its fragment at m/z 194. Hardly any signal is obtained for the molecular ions (radical cations M+.) of carbamazepine and acridine. Conversely, as displayed in FIGS. 3(*c*) and (*d*), the spectra of naphthalene (m/z 128) and diphenyl sulfide (m/z 186) show only molecular ions (radical cations M+.). Note that the latter spectra were taken from samples one hundred times more concentrated than those of carbamazepine and acridine, though the signal intensities attributable to the various species are similar. It is clear from these data that the efficiency of the APPI method, at present, is much lower for naphthalene and diphenyl sulfide than it is for carbamazepine and acridine.

In order to explain the discrepancies in ionization efficiencies observed for these species, it is first necessary to establish that ionization depends primarily upon reactions that are initiated by dopant photoions. This knowledge stems from the observation that ion production without a dopant is almost negligible (compare FIGS. 4 and 5, below). Thus, differences in photoionization cross-sections of the analytes can be discounted, and it can be surmised that ionization efficiency is governed largely by the ion-molecule reactions occurring after photoionization of the dopant in the APPI source. With regards to the mechanism responsible for the preferential ionization of certain species, the most obvious difference between the molecules selected for analysis lies in their relative proton affinities: carbamazepine and acridine both have at least one nitrogen that can accept a proton, while naphthalene and diphenyl sulfide have no such basic site. Hence, the observation that high proton affinity species are ionized preferentially points toward the empirical conclusion that proton transfer reactions are more prominent than charge-exchange reactions in the APPI source. Preliminary investigations indicate that there are at least several reaction pathways responsible for the observed results; one important process involves the reaction of dopant photoions with solvent molecules, which in turn may react by proton transfer with analytes having a high proton affinity.

The final spectrum in the series, FIG. 3(*e*), is a negative ion scan of 5-fluorouracil. The prominent peak at m/z 129 corresponds to the (M-H)-ion of the analyte. This figure has been included to demonstrate that the APPI method presented here can also be used in negative ion mode. Thus far few investigations have been made in this mode.

APPI Chromatograms

The APPI chromatograms presented in FIGS. 4(*a*) and (*b*) are comprised of the sum of the ion current detected by selected ion monitoring (SIM) of m/z 237, 180, 128, and 186. The four peaks, in order of elution, correspond to the signals for carbamazepine (1 pmol injected), acridine (1 pmol), naphthalene (100 pmol), and diphenyl sulfide (100 pmol). Both of these chromatograms were obtained without the benefit of an added dopant (for these experiments, the dopant introduction assembly was removed from the APPI source, and the auxiliary gas connection to the heated nebulizer was made in the standard way). FIG. 4(*a*) shows a typical chromatogram obtained when the LC solvent consisted of methanol and water, while FIG. 4(*b*) is representative of chromatograms obtained for the acetonitrile/water experiments. The composition of the solvent has little effect here on the chromatograms, other than the 2–3 times increase in sensitivity observed for naphthalene and diphenyl sulfide when methanol is used for the organic mobile phase. For both solvent systems, though, the efficiency of ionization is again found to be much higher for carbamazepine and acridine than for the low proton affinity species (note the sample load for each analyte). It is not clear that direct photoionization is the sole, or even the principal, mechanism responsible for the ionization observed in this case, because it seems unlikely that there are such marked differences in the photoionization cross-sections of these molecules (they all contain aromatic rings and have IP's below the photon energy). It may be then that analyte ionization occurs largely through photoion intermediates formed from trace amounts of impurities in the solvent, which react in a manner similar to that observed for toluene. Though there is presently insufficient evidence available to say with certainty what the ionization mechanism is, these data do serve, in any event, to illustrate that the efficiency of direct photoionization as an ionization method for LC-MS is quite low.

The chromatogram in FIG. 5 was obtained from the same sample solution analyzed to collect the data presented in FIGS. 4(*a*) and (*b*), and the organic solvent used for the gradient was methanol. The results obtained for acetonitrile/water were very similar, though slightly smaller signals were obtained for acridine (as shown in the APPI chromatograms of FIGS. 6*a* and 6*b*). Two chromatograms have been overlaid in FIG. 5: one was collected utilizing toluene as a dopant, and the other with acetone. First considering the toluene example, the increase in sensitivity (and signal-to-noise ratio) relative to the no-dopant case (compare the ions/sec scales of FIG. 4, without dopant with the scales of FIG. 5, with dopant) is striking: for carbamazepine and acridine, the increase in peak area is approximately one hundred times. The increase for naphthalene and diphenyl sulfide is somewhat less pronounced, but still significant at a factor of about twenty five. These data illustrate that toluene used as dopant can enhance the sensitivity of APPI towards species of both low and high proton affinity, through either proton transfer or charge-exchange reactions. Note again that the proton transfer reactions appear to be much more prominent. The APPI chromatogram obtained using acetone, on the other hand, illustrates that acetone is an effective dopant only for those compounds having high proton affinity: no gain in sensitivity at all is observed for naphthalene and diphenyl sulfide. Hence, the choice of dopant is an important factor affecting the sensitivity and selectivity of APPI.

Comparison Between APPI and APCI

Results from the experiments comparing APPI and the standard APCI source are presented in FIGS. 6(*a*) and (*b*). When methanol was the organic solvent, FIG. 6(*a*), the signals obtained for carbamazepine and acridine via APPI were at least eight times as great as those obtainable by the APCI source; the increase for naphthalene and phenyl sulfide was much higher, since the sensitivity of APCI towards low proton affinity species in the presence of methanol was found to be almost nil. When acetonitrile was used, FIG. 6(*b*), the advantage of APPI over APCI was maintained for carbamazepine and acridine, though the sensitivity of APCI towards naphthalene and diphenyl sulfide was much improved and was not much lower than that of APPI.

While a preferred embodiment of the present invention has been shown and described, it will be apparent to those skilled in the art that various changes and modifications may be made.

For example, while the experiments described above were conducted at normal atmospheric pressures (i.e. approximately 1 bar) it will be understood by those skilled in the art that the operating pressure may vary over a range. It is believed that an approximate upper limit would be about 2 bar, or two atmosphere, and with suitable equipment, an approximate lower limit would be about 0.1 bar, or one-tenth of atmosphere. It will be understood that an operating pressure of even one-tenth of atmosphere is orders of magnitude greater than the typical operating pressures found in the prior art, where PI was typically conducted in a vacuum or near-vacuum conditions. In general, the intention is that the vaporization and ionization will occur in a region that is at approximately the same operating pressure as a source of the sample solution (i.e. the LC) and at a pressure suited to an adjacent inlet chamber of a mass spectrometer.

It is therefore intended that the following claims will cover such changes and modifications that are within the spirit and scope of the present invention.

What is claimed is:

1. A method of analyzing a sample of an analyte, the method comprising:

(1) providing a sample solution comprising a solvent and an analyte as a sample stream;

(2) providing a dopant in the sample stream;

(3) forming a spray of droplets of the sample stream, to promote vaporization of the solvent and the analyte;

(4) vaporizing the droplets in said spray whereby the sample enters the vapour state;

(5) after step (2), in a region at atmospheric pressure, irradiating the sample stream with radiation to ionize the dopant, whereby at least one of subsequent collisions between said ionized dopant and said analyte, and indirect collisions of said analyte with solvent molecules acting as intermediates, results in ionization of said analyte; and (6) passing the ions into the mass analyzer of a mass spectrometer for mass analysis of the ions.

2. A method as claimed in claim 1, which includes, in step (5), irradiating the sample stream before step (4), to effect irradiation in the liquid state.

3. A method as claimed in claim 1, which includes, in step (5), irradiating the sample stream after step (4), to effect irradiation in the vapour state.

4. A method as claimed in claim 2 or 3, wherein the step (2) of providing a dopant comprises one of adding a separate dopant and utilizing the solvent as the dopant, and wherein the dopant is provided in one of the liquid state and the vapour state.

5. A method as claimed in claim 4, which includes providing a guide for guiding the sample stream and the ions in steps (3), (4) and (5).

6. A method as claimed in claim 5, which includes providing a guide with an end shaped to promote focusing of the ions.

7. A method as claimed in claim 5, which includes providing additional electrostatic focusing elements and a potential between a zone where the sample stream is irradiated in step (5) and the inlet of the mass spectrometer.

8. A method as claimed in claim 5 which includes causing the sample stream to flow in a first direction in steps (3), (4) and (5), and in step (6) passing the ions into a mass analyzer in a second direction, generally orthogonal to the first direction.

9. A method as claimed in claim 5 which includes passing the sample stream in essentially the same direction in all of steps (3), (4), (5) and (6).

10. A method as claimed in claim 4, which includes effecting the method on a sample solution including a plurality of analytes whereby all of said analytes are ionized to at least some extent, the method further including subjecting the analyte ions to a mass spectrometry step, to separate and to distinguish the different analytes.

11. A method as claimed in claim 4, which includes providing a focusing potential between at least a zone where the analyte is irradiated in step (5) and the inlet of the mass spectrometer.

12. A method as claimed in claim 2 or 3 which includes forming one of positive ions and negative ions in step (5).

13. A method as claimed in claim 1, which includes effecting steps (3) and (4), by passing the sample solution through a heated nebulizer probe, and providing an auxiliary gas flow to promote formation of droplets and vaporization of the solvent and the analytes, as well as transport of the vapour to and through the ionization region.

14. A method as claimed in claim 13, which includes, adding the dopant in step (2), by supplying an auxiliary gas including the dopant to the heated nebulizer probe.

15. A method as claimed in claim 1, 3 or 13, which includes, prior to step (3), subjecting the sample stream to liquid phase separation, to separate said analyte from other substances.

16. A method as claimed in claim 1, 3 or 13, wherein step (6) comprises passing the ions into a mass spectrometer operated at a pressure substantially below atmospheric pressure.

17. An apparatus, for irradiation of a sample stream, formed from a sample solution including a relatively large amount of some ionizable species and a relatively small amount of an analyte to be ionized, the apparatus comprising:

spray means for forming a spray of droplets from the sample stream for vaporisation of the sample stream;

dopant supply means for supplying dopant to the sample stream, wherein the dopant comprises additional ionizable species; and a means for irradiating the sample stream in a region at atmospheric pressure, to ionize the ionizable species, whereby at least one of subsequent collisions between said ionized species and the analyte and intermediate reactions between the ionized species and the analyte, results in charge transfer and ionization of the analyte; and a mass spectrometer for determining the mass-to-charge ratio of the ions formed by irradiating the sample stream.

18. An apparatus as claimed in claim 17, wherein the means for irradiation comprises a lamp, selected to provide photons having energy sufficient to ionize the ionizable species.

19. An apparatus as claimed in claim 17, wherein the means for forming a spray comprises a nebulizer, including an inlet for supply of a nebulizer gas.

20. An apparatus as claimed in claim 17, wherein the nebulizer includes an inlet for an auxiliary gas.

21. An apparatus as claimed in claim 17, wherein the dopant is supplied in the liquid phase and mixed with the sample solution.

22. An apparatus as claimed in claim 17, wherein the dopant is supplied in the vapour phase and mixed with vaporised sample stream.

23. An apparatus as claimed in claim 19 or 20, wherein the nebulizer includes a capillary tube, for receiving the sample stream and having an outlet for forming the spray of droplets, a channel for guiding the vaporised sample stream and extending from the outlet of the capillary tube, and a heater around the channel, adjacent the outlet of the capillary tube, for promoting vaporization of solvent and analyte.

24. An apparatus as claimed in claim 23, including a connector bracket, defining the channel for the vaporised sample stream and the ions and extending between the nebulizer and the mass spectrometer, and a high voltage power supply means connected to the connector bracket, for providing a focusing potential between a connector bracket and the mass spectrometer.

25. An apparatus as claimed in claim 17, wherein the means for irradiating comprises a laser.

26. An apparatus as claimed in claim 17, which includes liquid separation means, connected to the spray means, for subjecting the sample solution to liquid phase separation, prior to forming the spray of droplets.

27. A method of analyzing a sample of an analyte, the method comprising:

(1) providing a sample solution comprising a solvent and an analyte as a sample stream;

(2) providing a dopant in the sample stream;

(3) forming a spray of droplets of the sample stream, to promote vaporization of the solvent and the analyte;

(4) vaporizing the droplets in said spray whereby the sample enters the vapour state;

(5) after step (2), irradiating the sample stream with radiation to ionize the dopant, whereby at least one of subsequent collisions between said ionized dopant and said analyte, and indirect collisions of said analyte with solvent molecules acting as intermediates, results in ionization of said analyte; and (6) passing the ions into the mass analyzer of a mass spectrometer for mass analysis of the ions.

28. An apparatus, for irradiation of a sample stream, formed from a sample solution including a relatively large amount of some ionizable species and a relatively small amount of an analyte to be ionized, the apparatus comprising:

spray means for forming a spray of droplets from the sample stream for vaporisation of the sample stream;

dopant supply means for supplying dopant to the sample stream, wherein the dopant comprises additional ionizable species; and a means for irradiating the sample stream to ionize the ionizable species, whereby at least one of subsequent collisions between said ionized species and the analyte and intermediate reactions between the ionized species and the analyte, results in charge transfer and ionization of the analyte; and a mass spectrometer for determining the mass-to-charge ratio of the ions formed by irradiating the sample stream.

* * * * *